Dec. 23, 1952     W. G. SIMON     2,622,766
APPARATUS FOR DELIVERING MATERIAL FROM A SUPPLY
AT SUBSTANTIALLY CONSTANT RATE
Filed Jan. 18, 1950     3 Sheets-Sheet 3

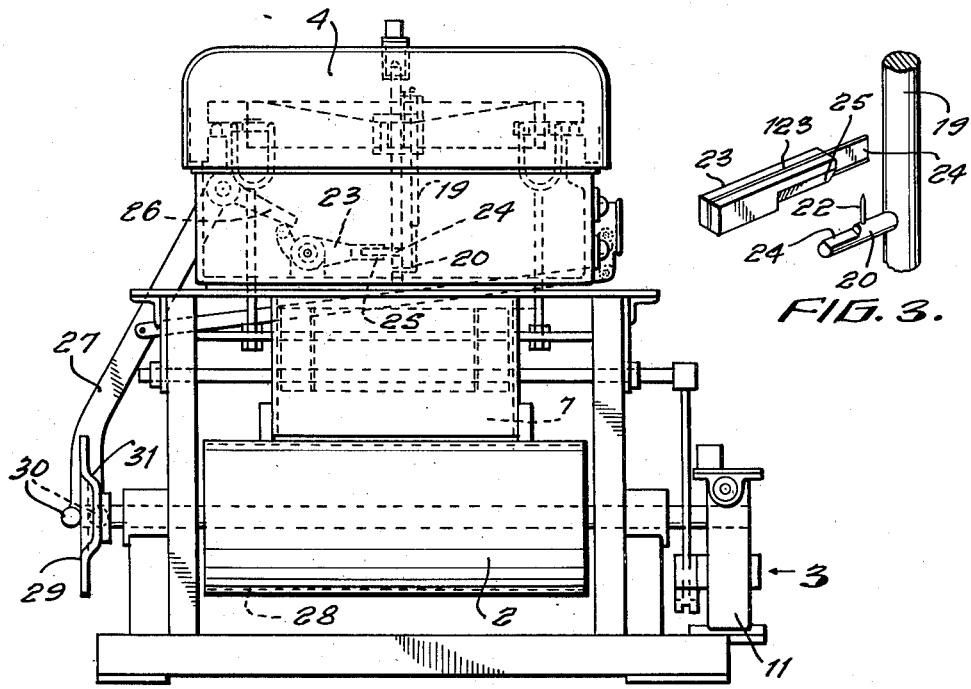
FIG. 2.
FIG. 3.
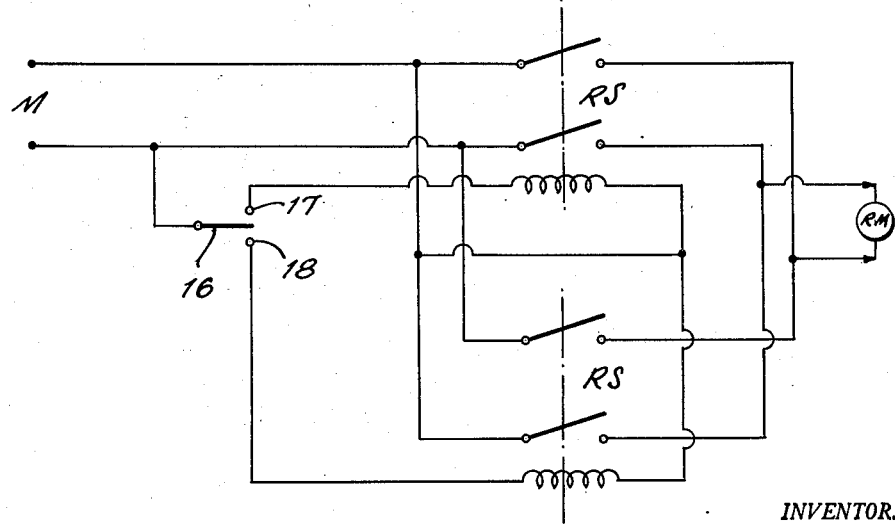
FIG. 4.
INVENTOR.
WILLIAM GEORGE SIMON
BY

INVENTOR.
WILLIAM GEORGE SIMON
BY

Patented Dec. 23, 1952

2,622,766

UNITED STATES PATENT OFFICE 2,622,766

APPARATUS FOR DELIVERING MATERIAL FROM A SUPPLY AT SUBSTANTIALLY CONSTANT RATE

William George Simon, Basford, England

Application January 18, 1950, Serial No. 139,154
In Great Britain May 13, 1949

7 Claims. (Cl. 222—55)

This invention is for improvements in or relating to apparatus for delivering material from a supply and has particular reference to apparatus of the type comprising a container or hopper for a bulk supply of the material, a conveyor for conveying such material continuously to a desired location, weighing mechanism sensitive to the weight of material on the conveyor, and adjustment means under control of the weighing mechanism for automatically ensuring that the conveyor delivers a constant or substantially constant weight of material per unit of time.

Apparatus of this nature is particularly suitable for use in the continuous mixing or blending of two or more ingredients.

An object of the invention is to provide improved apparatus of the said type and with this and other objects in view the invention provides material delivery apparatus comprising a hopper for a bulk supply of the material, a conveyor for conveying the material continuously to a desired location, weighing mechanism sensitive to the weight of material on the conveyor, means for feeding the material to the conveyor, adjustment means for controlling the delivery of the material, means associated with the weighing mechanism for actuating the adjustment means under control of the weight of material on the conveyor, and subsidiary control means for timing the adjustments at least when the variations in weight of the material on the conveyor are less than a predetermined minimum. Conveniently movement of the weighing mechanism which is less than a predetermined minimum results solely in determining the kind of adjustment required i. e. either to increase or decrease the delivery, and means such for example as a cam-actuated device is provided for effecting the adjustment at spaced intervals of time governed by the shape of the cam. When the variation in weight is greater than said minimum the weighing mechanism conveniently effects the appropriate adjustment direct i. e. not under control of said cam-actuated device or other timing means.

The invention also provides apparatus of the type referred to wherein adjustment is effected only during periods of predetermined duration. In this arrangement the weighing mechanism conveniently effects the adjustment direct for all variations in weight of material on the conveyor and means such for example as an electric timing device is provided which functions automatically to limit the length of time during which each adjustment is effected.

Any suitable type of adjustable delivery means for the material may be employed such for example as a fixed-speed belt conveyor having associated with it either an adjustable member controlling the size of a feeding aperture in a hopper or the like, or a variable-speed screw feeding device, the adjustment being effected by varying the size of the feed aperture or by varying the speed of the screw feeding device. In an alternative arrangement the aperture control and the screw feed is dispensed with and the conveyor is of the variable-speed type; in this arrangement the adjustment is effected by varying the speed of the conveyor. In any of the above mentioned arrangements the adjustment may be effected through the intermediary of any suitable adjusting device such for example as a reversible electric motor (for adjusting the aperture controlling member) or an electric motor operating a variable resistance, a variable inductance, a phase shifter or other regulator (for adjusting the means driving the screw feed or the conveyor). The said adjusting device may be actuated by any suitable means associated with the weighing mechanism such for example as by a part carried by the weighing machine and co-operating with suitable electrical contacts in circuit with the adjustment device.

The above and other features of the invention are set forth in the appended claims and are disclosed in the detailed description given by way of example of the particular embodiments:

Figure 2 is a general side view thereof.

Figure 3 is a perspective detail.

Figure 4 is a circuit diagram for the apparatus.

Figure 1:
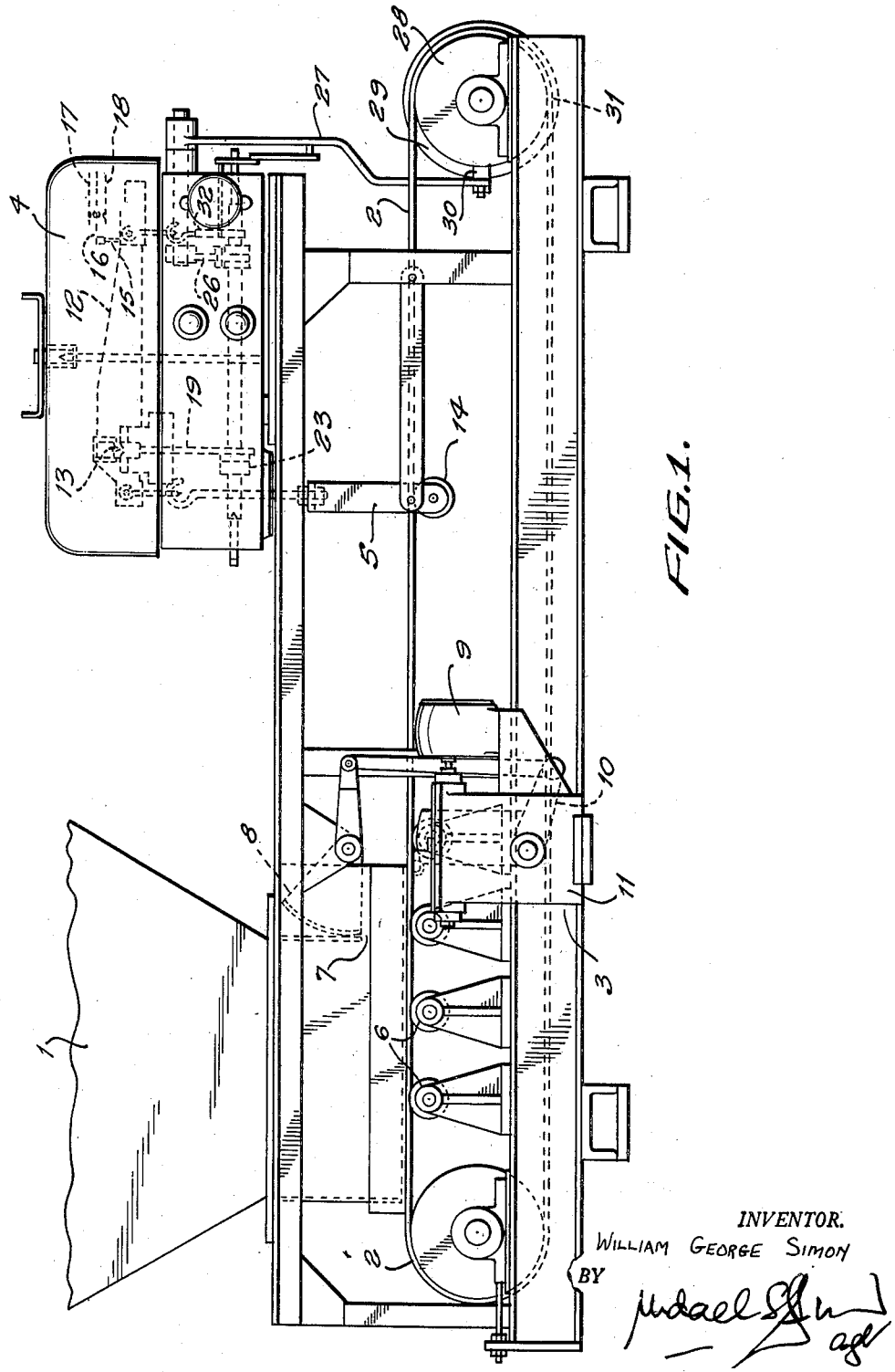
Figure 1 is a general front view of apparatus according to this invention.

Referring now to Figures 1 and 2 material delivery apparatus is provided comprising in the main, a hopper 1, a belt conveyor 2, an adjustment device 3, weighing mechanism 4, and means 5 for transmitting movement of the weighing mechanism 4 to the adjustment device 3. The said hopper 1 is located over one end of the belt conveyor 2 which is horizontally disposed and is driven by any suitable means. That part of the upper lap of the belt 2 which is located beneath the hopper 1 is supported on several, for example five, rollers 6 to take the weight of the material in the hopper 1. The lower edges of the hopper 1 are disposed in close proximity to the upper surface of the belt 2 and that wall of the hopper 1 nearest the centre of the belt 2 has an aperture 7 formed in it permitting the material to be withdrawn by the conveyor 2 from the hopper 1 in a continuous manner.

The said adjustment device 3 consists of a device for varying the size of said aperture 7 and for this purpose it comprises a pivoted member 8 which is adjustable in opposite directions about its pivot by a reversible electric motor 9 through the intermediary of suitable links and levers 10 and a gear box 11.

The weighing mechanism 4 consists in the main of a balance beam 12 which is located at that "delivery" end of the belt 2 remote from the hopper 1 and is mounted on suitable bearings and housed in a container if desired. The fulcrum 13 of the beam 12 is located at that end of the beam 12 nearest to the hopper 1 and said end of the beam 12 has depending from its extremity a link device (constituting the means 5) which extends to a location immediately below the upper lap of the belt. At this location the link 5 carries a roller 14 which extends immediately beneath the upper lap of the belt so that a raising and lowering movement of the belt due to varying weight of material thereon results in the weigh beam 12 being moved about its fulcrum 13.

For transmitting movement of the weigh beam 12 to the said adjustment device 3 there is provided fixed to the end of the long arm of the weigh beam 12 an adjustable screw 15 which engages a horizontally disposed spring arm contact 16. This contact 16 is disposed between upper and lower spaced contacts 17, 18 and said contacts 17, 18 are in circuit with said reversible electric motor 9. The arrangement is such that when the beam 12 moves beyond a predetermined minimum extent in one direction (according to the weight of material on the belt 2), the spring contact 16 engages one spaced contact (17 or 18) to actuate the motor 9 in one direction thereby adjusting the feed in one sense, and when the beam 12 moves beyond a predetermined minimum extent in the other direction the spring contact 16 engages the other spaced contact (17 or 18) to actuate the motor 9 in the reverse direction so as to adjust the feed in the opposite sense. Therefore adjustment is effected directly by the weigh beam 12 upon variations in weight above a predetermined minimum (e. g. 3 ozs.) only, and the said minimum weight is determined by the power of the spring contact 16. The object of this arrangement is to prevent promiscuous adjustments for every slight variation in weight. It is desirable however, to effect some adjustment for slight variations in weight and means are provided for effecting adjustments for variations in weight which are below said minimum at predetermined intervals.

For this purpose the long end of the weigh beam 12 has fixed to and depending from it an arm 19 which at its lower end has a laterally projecting finger member 20 (see also Figure 3). This finger member 20 has an upper knife edge 21 with inclined faces at its outermost part and an upwardly projecting tapered pin or peg 22 to the rear of said knife edge 21, and the arrangement is such that slight movement of the beam 12 due to slight variation in weight of material on the belt 2 results in a comparatively small side to side movement of said finger member 20. For co-operating with this finger member 20 there is a horizontal pivoted lever 23 one part 123 of which is reduced in width to form a knife-like part 24 disposed on its edge i. e. in a vertical plane and overlying the aforesaid pin or peg 22 on the finger member 20; immediately behind this knife part 24 a lower knife edge 25 having inclined faces is formed on the underside of said lever end and this part 25 overlies the aforesaid upper knife edge 21 with inclined faces of the finger member 20. The other end of said horizontal lever 23 is located immediately below one short end of a bell crank lever 26 the long end 27 of which extends downwardly to a location level with the centre line of the belt 2 and near the delivery end thereof. This end of the belt is mounted on a rotatable drum 28 and on one end of the drum there is fitted a disc cam 29 which is engaged by the lower end of said long arm 27 of the bell crank lever 26; for this purpose a pair of rollers or trucks 30 is carried by said arm 27 which engage one on each face of the cam 29. The cam 29 is plain for the major portion of its periphery but bulges laterally for the remaining part 31 and the arrangement is such that rotation of the cam 29 results in the bell crank 26 being moved about its pivot; this movement is transmitted by the short arm of the bell crank 26 to the aforesaid horizontal lever 23 having the part 123 with knife edges 24, 25 in such manner that said part 123 is lowered into engagement with one side or the other of said finger member 20 according to the lateral setting of its pin or peg 22 as determined by the weigh beam 12. Further lowering movement of the part 123 of said horizontal lever 23 results in the appropriate inclined face of the knife edge 25 of the part 123 striking the appropriate inclined face of the knife edge 21 of the finger member 20 so as to deflect the finger member 20 to a greater extent that that to which it was deflected by the weigh beam 12.

Viewing the above arrangement from a different aspect it may be said that the power of the spring of the spring contact 16 is such that variations in the load on the belt 2 which are less than a predetermined minimum result only in a slight movement either up or down of said spring contact 16 said movement not being sufficient to engage the spring contact 16 with either of the spaced contacts 17 or 18. The movement is however, sufficient to displace the said finger member 20 slightly to one side or the other as previously intimated, and, at predetermined times i. e. each time the disc cam 29 has rotated sufficiently to move the bell crank 26, the finger member 20 is moved further in the desired direction by the horizontal lever 23; this results in such further movement of the weigh beam 12 that the spring contact 16 does in fact engage the appropriate spaced contact 17 or 18 which in turn starts the reversible motor 9 to drive in the appropriate direction and adjust the feed lines 8 in the desired sense at each of said predetermined times until normal conditions prevail.

The weight beam 12 may be adjusted to determine the constant weight required by adding to it or taking from it one or more weights 32 (Figure 1) at the end of its longer arm. A suitable circuit for the apparatus is shown in Figure 4, wherein the contacts 16, 17 and 18 are shown connected to mains M and connectible to the reversible motor RM through the intermediary of either of two relay or solenoid operated switches RS according to the position of switch 16.

Figure 5:
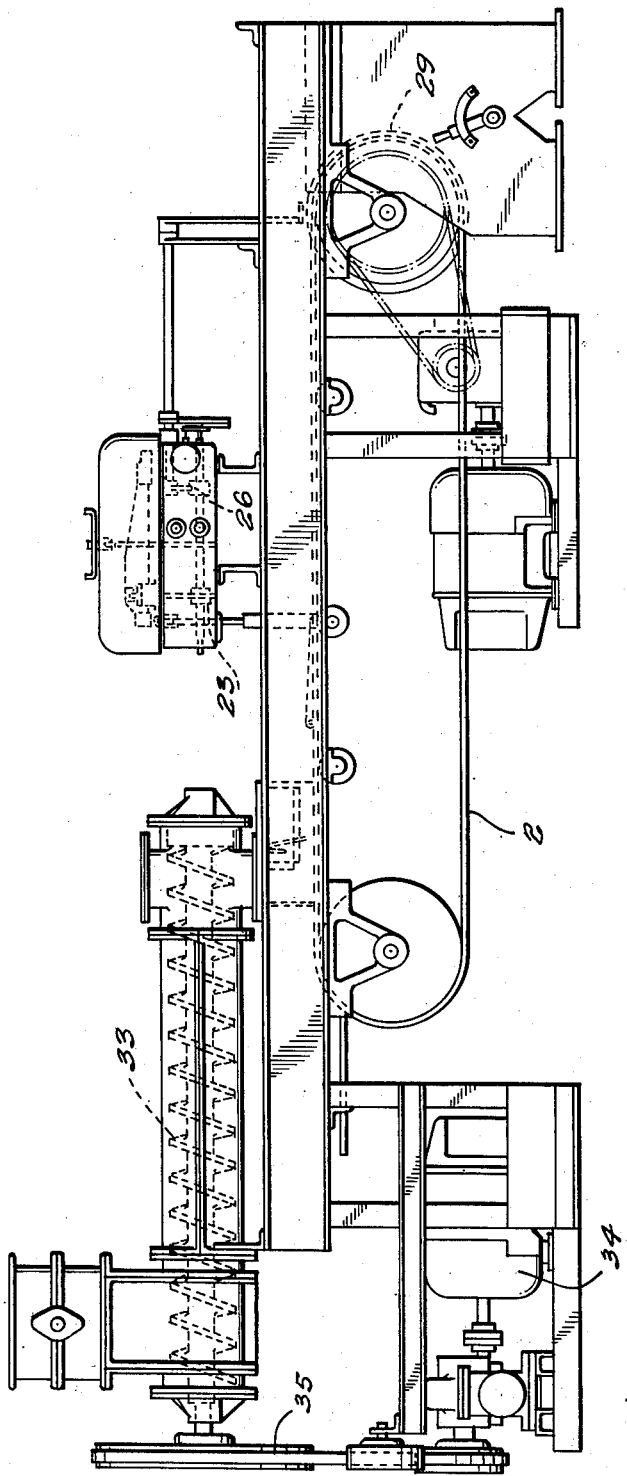
Figure 5 is a general side view of a modified arrangement.

In an alternative arrangement the aperture in the wall of the hopper and the adjusting member is dispensed with and a feed-screw device 33 (Figure 5) is substituted therefor driven by a variable speed motor 34 through suitable mechanism 35. In this arrangement the control may be as above described except that the variable speed 34 motor functions to vary the speed of the feed-screw 33 when for example, a variable resistance or variable inductance of the like associated with the motor, or the brush moving gear if the motor is a commutator A. C. motor, is adjusted say by the switches 16, 17 and 18 or the cam 29 through the medium of the bell crank 26, horizontal lever 23 and finger member 20.

I claim:

1. In a material conveying apparatus which has an adjusting mechanism for regulating the rate of material flow within predetermined limits, apparatus for periodically adjusting the rate of material of flow within limits, smaller than the predetermined limits, comprising in combination, a pivotally mounted arm operatively connected to the adjusting mechanism for actuating the same when said pivotally mounted arm is moved from a neutral position to one of two positions respectively corresponding to the predetermined limits; control means fixedly connected to said arm for movement therewith; and periodic moving means operatively connected to said control means for periodically moving the same when said arm is out of said neutral position so as to thereby move said arm with said control means and actuate the adjusting mechanism, whereby, when said arm is between said neutral position and one of said two positions, said moving means will periodically move said control means to move said arm to one of said two positions and thereby cause said arm to actuate the adjusting means so as to adjust the rate of material flow.

2. In a material conveying apparatus which has an adjusting mechanism for regulating the rate of material flow within predetermined limits, apparatus for periodically adjusting the rate of material of flow within limits smaller than the predetermined limits, comprising in combination, a pivotally mounted arm operatively connected to the adjusting mechanism for actuating the same when said pivotally mounted arm is moved from a neutral position to one of two positions respectively corresponding to the predetermined limits; control means fixedly connected to said arm for movement therewith in one direction away from a central position when said arm moves from said neutral position toward one of said two positions and in another direction, opposite to said one direction, from said central position when said arm moves from said neutral position to the other of said two positions; and periodic moving means operatively connected to said control means for periodically moving the same away from said central position in the particular direction that said control means has already been moved by said arm when said arm is out of said neutral position so as to thereby move said arm with said control means and actuate the adjusting mechanism, whereby, when said arm is between said neutral position and one of said two positions, said moving means will periodically move said control means to move said arm to one of said two positions and thereby cause said arm to actuate the adjusting means so as to adjust the rate of material flow.

3. In a material conveying apparatus which has an adjusting mechanism for regulating the rate of material flow within predetermined limits, apparatus for periodically adjusting the rate of material of flow within limits smaller than the predetermined limits, comprising in combination, a pivotally mounted elongated arm operatively connected to the adjusting mechanism for actuating the same when said pivotally mounted arm is moved from a neutral position to one of two positions respectively corresponding to the predetermined limits; control means fixedly connected to said arm for movement therewith in one direction away from a central position when said arm moves from said neutral position toward one of said two positions and in another direction, opposite to said one direction, from said central position when said arm moves from said neutral position to the other of said two positions, said control means comprising a first elongated member connected adjacent one end thereof to said arm adjacent to the pivot center of said arm and being located in the plane of pivotal movement of said arm so that the end of said first elongated member opposite to said one end thereof moves in said plane with the pivotal movement of said arm, and a second elongated member fixedly connected to said first elongated member adjacent said opposite end thereof and extending in a direction substantially perpendicular to said plane; and periodic moving means operatively connected to said control means for periodically moving the same away from said central position in the particular direction that said control means has already been moved by said arm when said arm is out of said neutral position so as to thereby move said arm with said control means and actuate the adjusting mechanism, whereby, when said arm is between said neutral position and one of said two positions, said moving means will periodically move said control means to move said arm to one of said two positions and thereby cause said arm to actuate the adjusting means so as to adjust the rate of material of flow, said moving means comprising a pivotally mounted weight member located over said second elongated member when said control means is in said central position, said weight member being mounted for movement into and out of contact with said second elongated member, whereby, when said control means has been moved in said one direction by said arm, said weight member contacts said second elongated member on one side thereof to further move said control means in said one direction and when said control means has been moved in said other direction said weight member contacts said second elongated member on another side opposite to said one side thereof so as to further move said control means in said other direction.

4. In a material conveying apparatus which has an adjusting mechanism for regulating the rate of material flow within predetermined limits, apparatus for periodically adjusting the rate of material of flow within limits smaller than the predetermined limits, comprising in combination, a pivotally mounted elongated arm operatively connected to the adjusting mechanism for actuating the same when said pivotally mounted arm is moved from a neutral position to one of two positions respectively corresponding to the predetermined limits; control means fixedly connected to said arm for movement therewith in one direction away from a central position when said arm moves from said neutral position toward one of said two positions and in another direction, opposite to said one direction, from said central position when said arm moves from said neutral position to the other of said two positions, said control means comprising a first elongated member connected adjacent one end thereof to said arm adjacent to the pivot center of said arm and being located in the plane of pivotal movement of said arm so that the end of said first elongated member opposite to said one end thereof moves in said plane with the pivotal movement of said arm, a second elongated member fixedly connected to said first elongated member adjacent said opposite end thereof and extending in a direction substantially perpendicular to said plane, and a pin member extending from said elongated member in an upward direction parallel to said plane; and periodic moving means operatively connected to said control means for periodically moving the same away from said central position in the particular direction that said control means has already been moved by said arm when said arm is out of said neutral position so as to thereby move said arm with said control means and actuate the adjusting mechanism, whereby, when said arm is between said neutral position and one of said two positions, said moving means will periodically move said control means to move said arm to one of said two positions and thereby cause said arm to actuate the adjusting means so as to adjust the rate of material of flow, said moving means comprising a pivotally mounted weight member located over said second elongated member when said control means is in said central position, said weight member being mounted for movement into and out of contact with said second elongated member, and a knife edge connected to said weight member and located over said pin member when said control means is in said central position, whereby, when said control means has been moved in said one direction by said arm, said weight member contacts said second elongated member on one side thereof to further move said control means in said one direction and when said control means has been moved in said other direction said weight member contacts said second elongated member on another side opposite to said one side thereof so as to further move said control means in said other direction, and thereby, when said control means is in said central position, said pin member engages said knife edge when said weight means is moved towards said second elongated member to prevent said weight means from contacting said second elongated member.

5. In a material conveying apparatus which has an adjusting mechanism for regulating the rate of material flow within predetermined limits, apparatus for periodically adjusting the rate of material of flow within limits smaller than the predetermined limits, comprising in combination, a pivotally mounted elongated arm operatively connected to the adjusting mechanism for actuating the same when said pivotally mounted arm is moved from a neutral position to one of the two positions respectively corresponding to the predetermined limits; control means fixedly connected to said arm for movement therewith in one direction away from a central position when said arm moves from said neutral position toward one of said two positions and in another direction, opposite to said one direction, from said central position when said arm moves from said neutral position to the other of said two positions, said control means comprising a first elongated member connected adjacent one end thereof to said arm adjacent to the pivot center of said arm and being located in the plane of pivotal movement of said arm so that the end of said first elongated member opposite to said one end thereof moves in said plane with the pivotal movement of said arm, a second elongated member fixedly connected to said first elongated member adjacent said opposite end thereof and extending in a direction substantially perpendicular to said plane, and a pin member extending from said elongated member in an upward direction parallel to said plane; and periodic moving means operatively connected to said control means for periodically moving the same away from said central position in the particular direction that said control means has already been moved by said arm when said arm is out of said neutral position so as to thereby move said arm with said control means and actuate the adjusting mechanism, whereby, when said arm is between said neutral position and one of said two positions, said moving means will periodically move said control means to move said arm to one of said two positions and thereby cause said arm to actuate the adjusting means so as to adjust the rate of material of flow, said moving means comprising a pivotally mounted weight member located over said second elongated member when said control means is in said central position, said weight member being mounted for movement into and out of contact with said second elongated member, a knife edge connected to said weight member and located over said pin member when said control means is in said central position, a pivotally mounted lever engaging said pivotally mounted weight member for raising the same away from said second elongated member and for permitting the same to be lowered by gravity into contact with said second elongated member, and cam means operatively connected to said lever for periodically moving the same to thereby periodically raise said weight member away from said second elongated member and periodically permit said weight member to be lowered toward said second elongated member, whereby, when said control means has been moved in said one direction by said arm, said weight member contacts said second elongated member on one side thereof to further move said control means in said one direction and when said control means has been moved in said other direction said weight member contacts said second elongated member on another side opposite to said one side thereof so as to further move said control means in said other direction, and whereby, when said control means is in said central position, said pin member engages said knife edge when said weight means is moved towards said second elongated member to prevent said weight means from contacting said second elongated member.

6. An adjusting mechanism, comprising in combination, an elongated, control member mounted for movement in opposite directions away from a plane passing through said control member when the latter is in a neutral position, said control member having a pair of beveled surfaces on opposite sides thereof and on one side of the central axis thereof, said beveled surfaces of said control member being respectively located on opposite sides of said plane when said control member is in said neutral position; and an elongated actuating member mounted for movement in said plane toward and away from said control member and being located on said one side of said central axis thereof, said actuating member being formed with a pair of beveled surfaces facing said beveled surfaces of said control member and respectively located on opposite sides of said plane, each of said beveled surfaces of said actuating member being of substantially the same inclination as the beveled surface on said control member which is located on the opposite side of said plane when said control member is in said neutral position, whereby, when said control member is out of said neutral position and said actuating member is moved toward and into contact with the same, one of the beveled surfaces of said actuating member will contact that beveled surface of said control member which is of substantially the same inclination as said one beveled surface and thereby urge said control member further away from said plane.

7. An adjusting mechanism, comprising in combination, an elongated, control member mounted for movement in opposite directions away from a plane passing through said control member when the latter is in a neutral position, said control member having a pair of beveled surfaces on opposite sides thereof and on one side of the central axis thereof, said beveled surfaces of said control member being respectively located on opposite sides of said plane when said control member is in said neutral position; a pin member connected to and extending away from said control member, said pin member being located on said one side of said central axis of said control member and being located in said plane when said control member is in said neutral position; an elongated actuating member mounted for movement in said plane toward and away from said control member and being located on said one side of said central axis thereof, said actuating member being formed with a pair of beveled surfaces facing said beveled surfaces of said control member and respectively located on opposite sides of said plane, each of said beveled surfaces of said actuating member being of substantially the same inclination as the beveled surface on said control member which is located on the opposite side of said plane when said control member is in said neutral position, whereby, when said control member is out of said neutral position and said actuating member is moved toward and into contact with the same, one of the beveled surfaces of said actuating member will contact that beveled surface of said control member which is of substantially the same inclination as said one beveled surface and thereby urge said control member further away from said plane; and a knife edge connected to said actuating member for movement therewith and being located in said plane and facing said pin member, whereby, when said control member is in said neutral position and said actuating member is moved towards said control member, said knife edge will contact said pin member and prevent movement of said actuating member into contact with said control member.

WILLIAM GEORGE SIMON.

REFERENCES CITED

The following references are of record in the file of this patent:

UNITED STATES PATENTS

| Number | Name | Date |
|---|---|---|
| 2,047,203 | Henson | July 14, 1936 |
| 2,343,722 | Wagoner | Mar. 7, 1944 |